(12) United States Patent
Deng et al.

(10) Patent No.: US 10,899,306 B2
(45) Date of Patent: Jan. 26, 2021

(54) SIDE-IMPACT RESTRAINT SYSTEM

(71) Applicant: Ford Global Technologies, LLC, Dearborn, MI (US)

(72) Inventors: Zhibing Deng, Northville, MI (US); Deepak Patel, Canton, MI (US); Krishnakanth E. Aekbote, Novi, MI (US); Yun Cai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 16/209,166

(22) Filed: Dec. 4, 2018

(65) Prior Publication Data
US 2020/0172042 A1 Jun. 4, 2020

(51) Int. Cl.
*B60R 21/232* (2011.01)
*B60R 21/2338* (2011.01)
*B60R 21/231* (2011.01)
*B60R 21/00* (2006.01)
*B60R 21/233* (2006.01)

(52) U.S. Cl.
CPC ........ *B60R 21/232* (2013.01); *B60R 21/2338* (2013.01); *B60R 21/23138* (2013.01); *B60R 2021/0048* (2013.01); *B60R 2021/23324* (2013.01); *B60R 2021/23382* (2013.01)

(58) Field of Classification Search
CPC ............ B60R 21/232; B60R 21/23138; B60R 21/2338; B60R 21/213; B60R 21/233; B60R 21/231; B60R 2021/0048; B60R 2021/23324; B60R 2021/23382; B60R 2021/23308; B60R 2021/23316; B60R 2021/0006
USPC ............. 280/730.2, 729, 743.2, 743.1, 730.1
See application file for complete search history.

(56) References Cited

U.S. PATENT DOCUMENTS

| 5,496,061 A | 3/1996 | Brown | |
| 6,296,276 B1 * | 10/2001 | Ritter | D03D 1/02 280/743.2 |
| 6,511,093 B2 | 1/2003 | Buerkle et al. | |
| 6,572,137 B2 | 6/2003 | Bossecker et al. | |
| 6,962,363 B2 | 11/2005 | Wang et al. | |
| 2007/0013178 A1 * | 1/2007 | Aird | B60R 21/26 280/740 |

FOREIGN PATENT DOCUMENTS

| EP | 0592815 A1 | 4/1994 |
| JP | 2012071723 A | 4/2012 |
| WO | 2017202280 A1 | 11/2017 |

* cited by examiner

*Primary Examiner* — Keith J Frisby
(74) *Attorney, Agent, or Firm* — Frank A. MacKenzie; Bejin Bieneman PLC (57) ABSTRACT

A restraint system includes a side curtain airbag and a tether. The side curtain airbag includes an outboard side and an inboard side, and the inboard side including a protrusion. The tether includes a central seam, a first extension attached at the outboard side, a second extension attached at the inboard side above the protrusion, and a third extension attached at the inboard side below the protrusion. The extensions are attached to each other at the central seam.

20 Claims, 8 Drawing Sheets

SIDE-IMPACT RESTRAINT SYSTEM

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

DETAILED DESCRIPTION

A restraint system includes a side curtain airbag and a tether. The side curtain airbag includes an outboard side and an inboard side, and the inboard side includes a protrusion. The tether includes a central seam, a first extension attached at the outboard side, a second extension attached at the inboard side above the protrusion, and a third extension attached at the inboard side below the protrusion. The extensions are attached to each other at the central seam.

The side curtain airbag may be inflatable to an inflated position, and the tether may extend longitudinally along a full length of the protrusion when the side curtain airbag is in the inflated position.

The side curtain airbag may be inflatable to an inflated position, and the protrusion may be elongated along the inboard side when the side curtain airbag is in the inflated position. The protrusion may be elongated in a rearward, upward-sloping direction when the side curtain airbag is in the inflated position.

The protrusion may be elongated at an angle between 0° and 45° relative to horizontal when the side curtain airbag is in the inflated position.

The first extension may include a cutout. The first extension may include a plurality of cutouts including the cutout.

The second extension may include a cutout. The second extension may include a plurality of cutouts including the cutout.

The third extension may include a cutout. The third extension may include a plurality of cutouts including the cutout.

The restraint system may further include a second tether including a central seam, a first extension attached at the outboard side, a second extension attached at the inboard side above the protrusion, and a third extension attached at the inboard side below the protrusion, and the extensions of the second tether may be attached to each other at the central seam of the second tether.

The restraint system may further include a seat, and the side curtain airbag may be inflatable to an inflated position, and when the side curtain airbag is in the inflated position, the protrusion may be positioned laterally relative to the seat from a position at which a neck of an occupant of 50th-percentile stature sitting in the seat would be located.

The side curtain airbag may be inflatable to an inflated position, the side curtain airbag may include a top edge and a bottom edge, and the protrusion may be spaced from the top edge and the bottom edge when the side curtain airbag is in the inflated position. The restraint system may further include a roof rail, and the top edge may be attached at the roof rail.

The restraint system may further include a roof rail from which the side curtain airbag is inflatable, and the outboard side may face outboard relative to the roof rail and the inboard side may face inboard relative to the roof rail when the side curtain airbag is in the inflated position. The side curtain airbag may be a first side curtain airbag, and the restraint system may further include a second side curtain airbag inflatable from the roof rail and disposed rearward of the first side curtain airbag.

The first extension, the second extension, and the third extension may define a Y-shaped cross-section of the tether.

With reference to the Figures, a restraint system 32 for a vehicle 30 includes a first side curtain airbag 34 and a tether 36. The first side curtain airbag 34 includes an outboard side 38 and an inboard side 40, and the inboard side 40 including a protrusion 42. The tether 36 includes a central seam 44, a first extension 46 attached at the outboard side 38, a second extension 48 attached at the inboard side 40 above the protrusion 42, and a third extension 50 attached at the inboard side 40 below the protrusion 42. The extensions 46, 48, 50 are attached to each other at the central seam 44.

The restraint system 32 can provide cushioning in the event of a side impact. The side curtain airbag can reduce a likelihood of an occupant moving through the window 62 during the impact. The protrusion 42 can reduce head injury criterion (HIC) and/or a brain injury criterion (BrIC) by cushioning a neck of the occupant and/or by reducing a roll of the head of the occupant.

Figure 1:
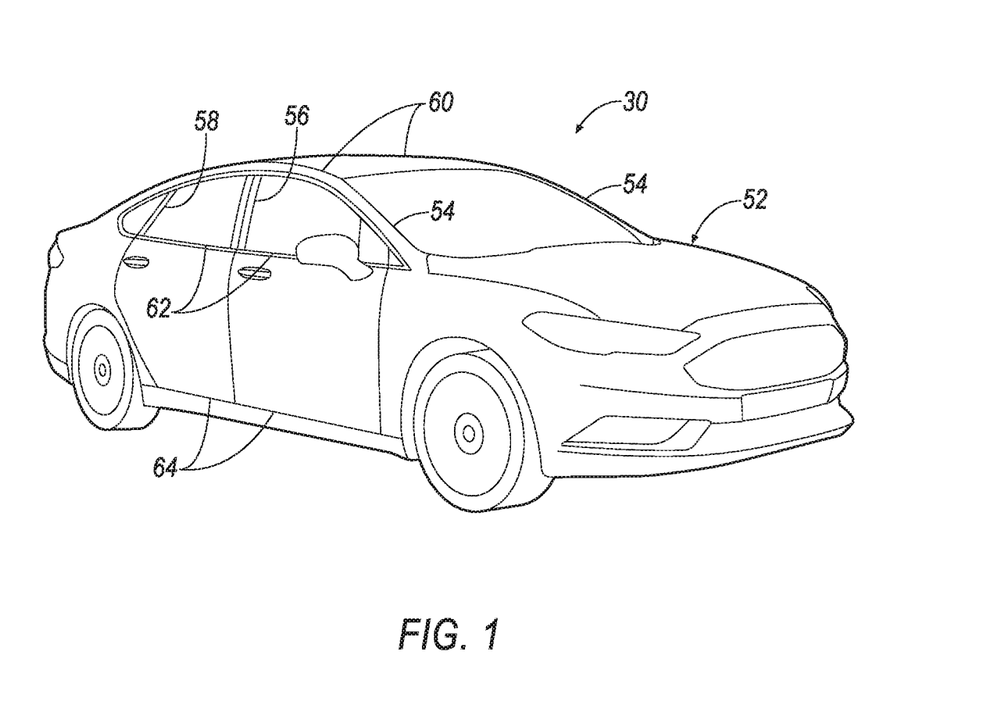
FIG. 1 is a perspective view of a vehicle.

With reference to FIG. 1, the vehicle 30 may be any passenger or commercial automobile such as a car, a truck, a sport utility vehicle, a crossover, a van, a minivan, a taxi, a bus, etc. The vehicle 30 includes a body 52. The vehicle may be of a unibody construction, in which a frame and the body 52 of the vehicle are a single component. The vehicle may, alternatively, be of a body-on-frame construction, in which the frame supports the body 52 that is a separate component from the frame. The frame and the body 52 may be formed of any suitable material, for example, steel, aluminum, etc.

The body 52 of the vehicle may include A pillars 54, B pillars 56, C pillars 58, and roof rails. The A pillars 54 may extend between a windshield and windows. The B pillars 56 may extend between windows of adjacent doors. The C pillars 58 may extend between the windows and a backlite. The body 52 may also include D pillars (not shown) if the vehicle is, e.g., an SUV, crossover, minivan, or station wagon, in which case the C pillars 58 extend between the windows of rear doors and rear left and right windows, and the D pillars extend between the rear right and left windows and the backlite. The roof rails extend along the windows from the A pillar 54 to the B pillar 56 to the C pillar 58.

Figure 2:
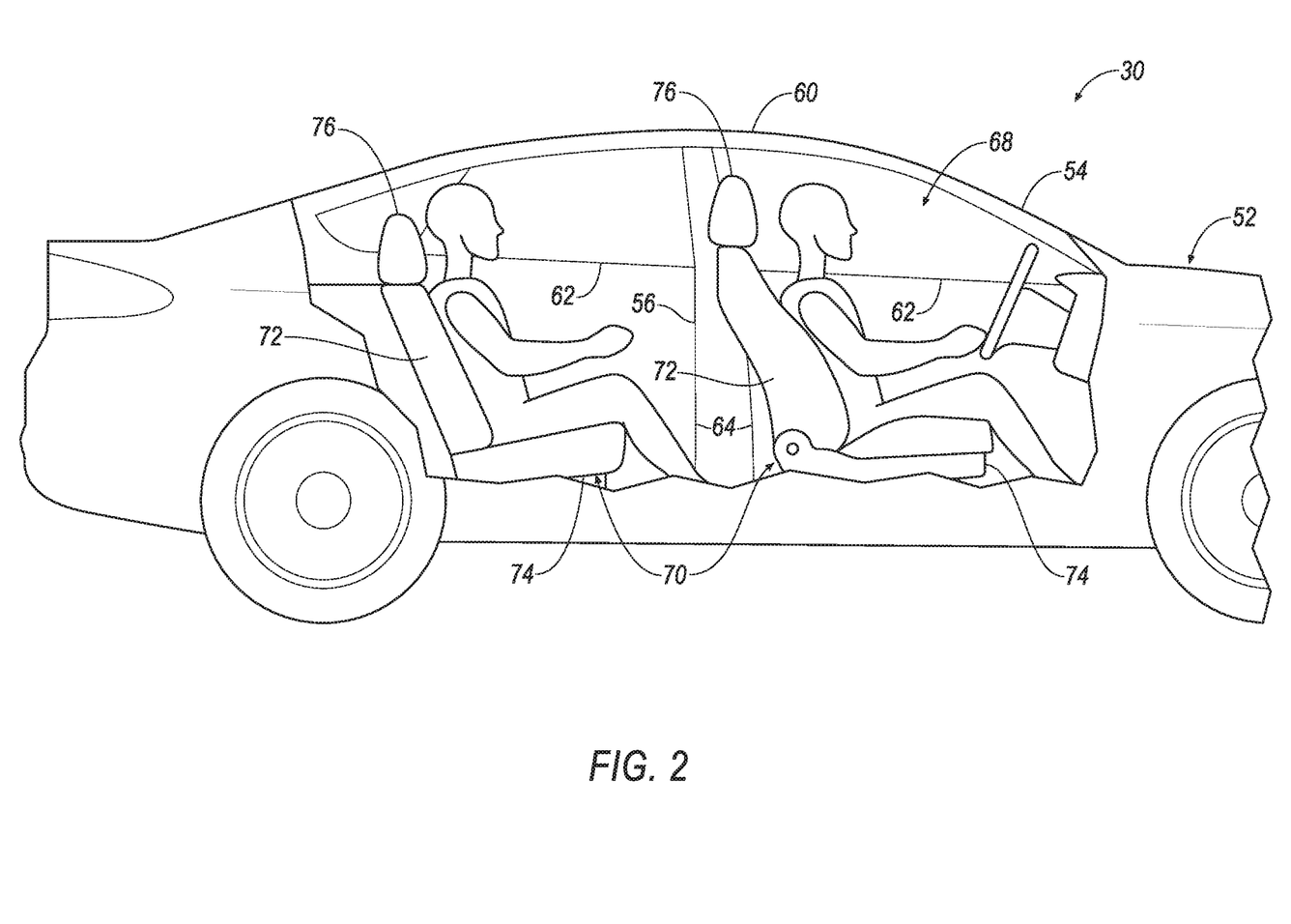
FIG. 2 is a side view of a passenger cabin of the vehicle.

With reference to FIG. 2, the vehicle 30 includes a passenger cabin 68 to house occupants, if any, of the vehicle 30. The passenger cabin 68 includes one or more front seats 70 disposed at a front of the passenger cabin 68 and one or more back seats 70 disposed behind the front seats 70. The passenger cabin 68 may also include third-row seats 70 (not shown) at a rear of the passenger cabin 68. In FIG. 1, the front seat 70 is shown to be a bucket seat, but the seats 70 may be other types. The position and orientation of the seats 70 and components thereof may be adjustable by an occupant.

Each seat 70 may include a seat back 72, a seat bottom 74, and a head restraint 76. The head restraint 76 may be supported by the seat back 72 and may be stationary or movable relative to the seat back 72. The seat back 72 may be supported by the seat bottom 74 and may be stationary or movable relative to the seat bottom 74. The seat back 72, the seat bottom 74, and/or the head restraint 76 may be adjustable in multiple degrees of freedom. Specifically, the seat back 72, the seat bottom 74, and/or the head restraint 76 may themselves be adjustable, in other words, adjustable components within the seat back 72, the seat bottom 74, and/or the head restraint 76, and/or may be adjustable relative to each other.

The vehicle 30 includes the doors 64 openable for occupants to enter and exit the passenger cabin 68. Each door 64 includes the respective window 62, which may be positioned in an upper half of the door 64. The roof rails 60 contact a top edge of the doors 64. The vehicle 30 may include two roof rails 60 each elongated along a right edge and left edge respectively of a ceiling of the passenger cabin 68.

Figure 3:
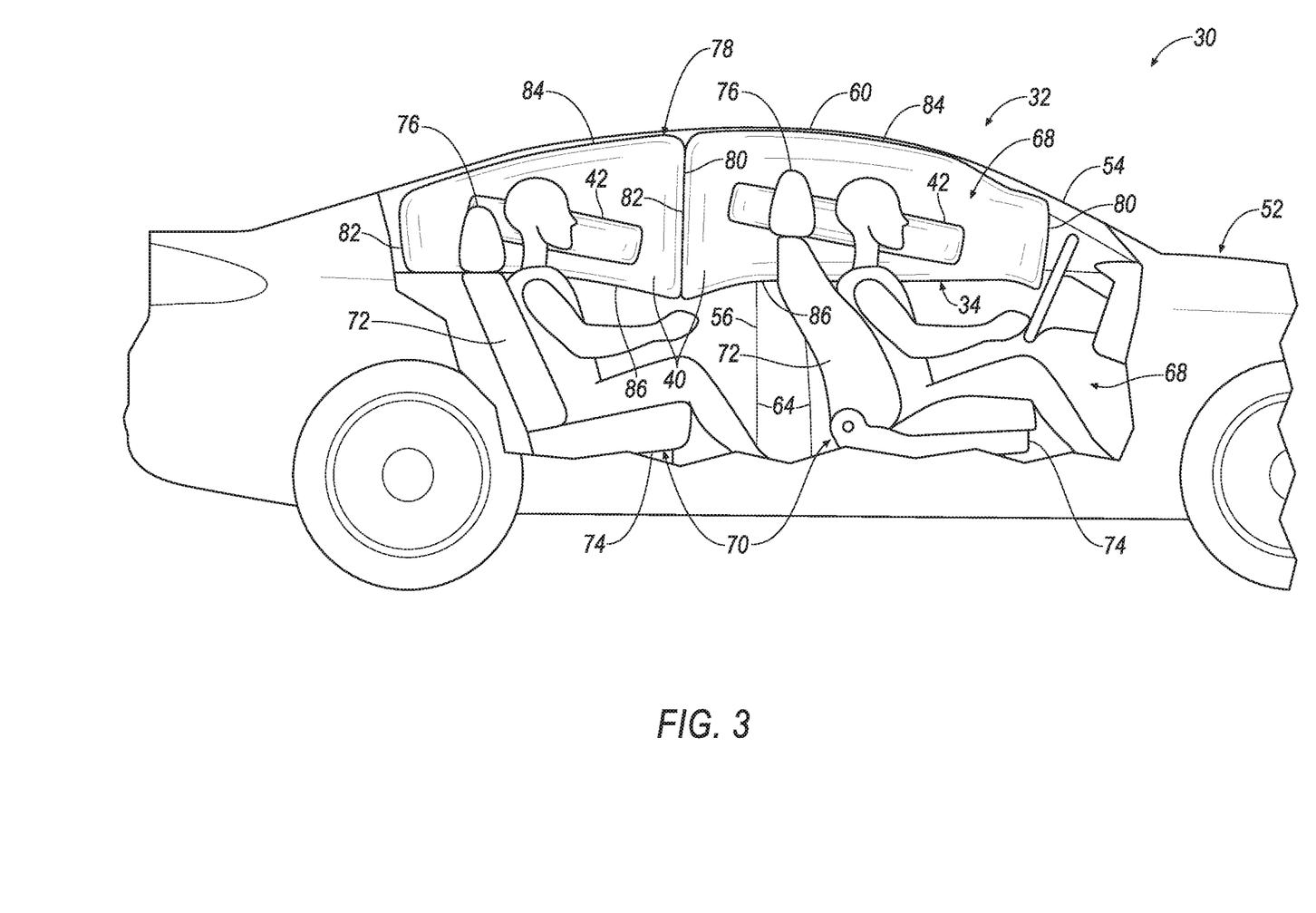
FIG. 3 is a side view of the passenger cabin with a side curtain airbag in an inflated position.

With reference to FIG. 3, the first side curtain airbag 34 is inflatable from an uninflated position to an inflated position. The figures depict the restraint system 32 located in the left side of the vehicle 30, but the restraint system 32 may additionally or alternatively be located in the right side of the vehicle 30, and all the description below applies to the right side and left side equally. The first side curtain airbag 34 is attached to the roof rail 60. The first side curtain airbag 34 in the uninflated position is folded inside the roof rail 60. The first side curtain airbag 34 in the inflated position extends adjacent at least one of the doors 64. The first side curtain airbag 34 in the inflated position may cover one of the windows 62. The first side curtain airbag 34 in the inflated position may extend from the roof rail 60 to the door 64 below the window 62 and may extend from the A pillar 54 to the B pillar 56.

A second side curtain airbag 78 is inflatable from the uninflated position to the inflated position. The second side curtain airbag 78 may be attached to the same roof rail 60 as the first side curtain airbag 34. The second side curtain airbag 78 may be disposed rearward of the first side curtain airbag 34. The first side curtain airbag 34 may be inflatable adjacent a front door 64, and the second side curtain airbag 78 may be inflatable adjacent a rear door 64. The second side curtain airbag 78 in the inflated position may cover one of the windows 62. The second side curtain airbag 78 in the inflated position may extend from the roof rail 60 to the door 64 below the window 62 and may extend from the B pillar 56 to the C pillar 58. The description below of the first side curtain airbag 34 may also apply to the second side curtain airbag 78.

Figure 4:
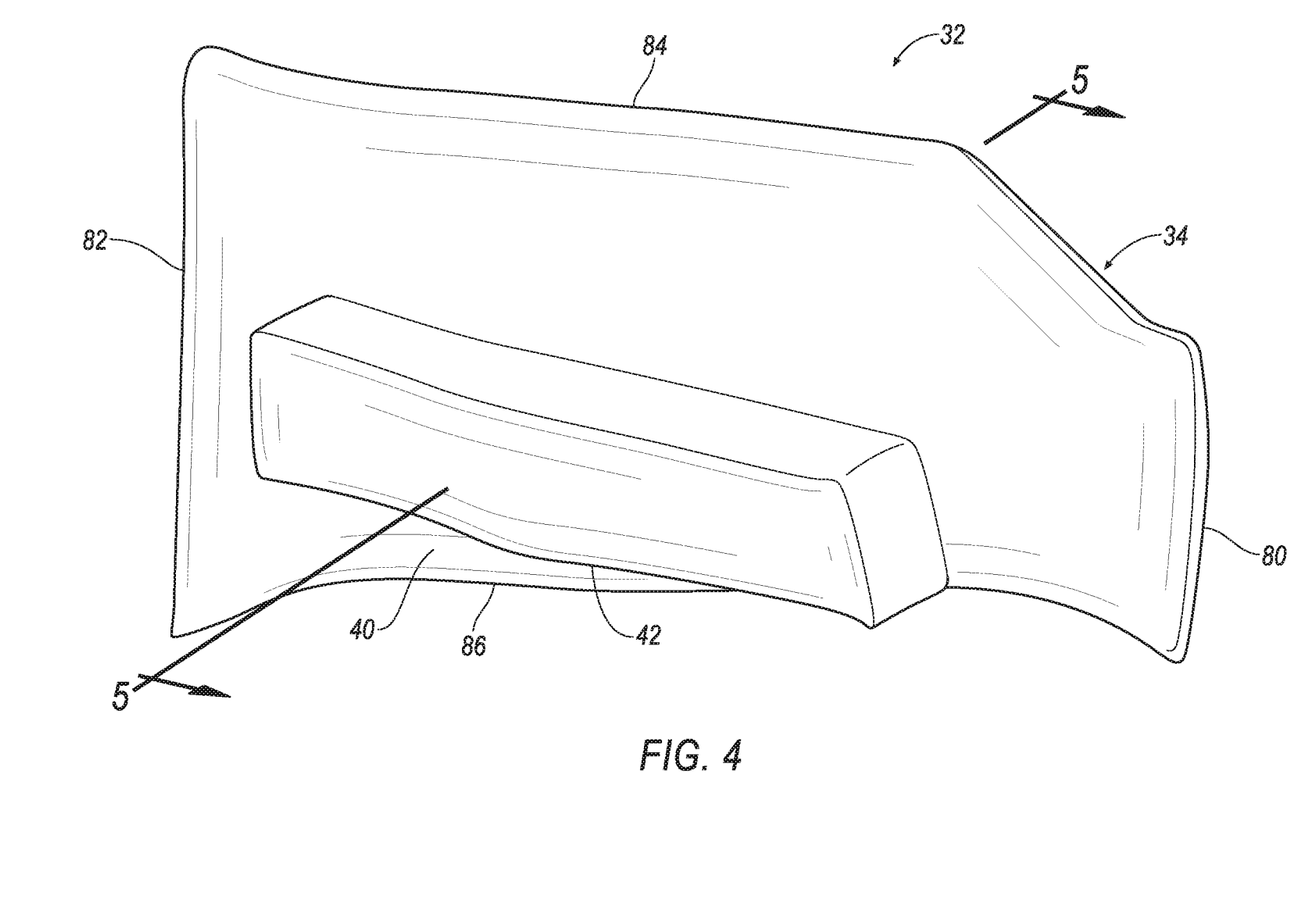
FIG. 4 is a perspective view of the side curtain airbag in the inflated position.

With reference to FIG. 4, the first side curtain airbag 34 includes the outboard side 38 and the inboard side 40. When the first side curtain airbag 34 is in the inflated position, the outboard side 38 faces outboard relative to the roof rail 60, and the inboard side 40 faces inboard relative to the roof rail 60. The outboard side 38 faces toward the doors 64, and the inboard side 40 faces toward a centerline of the vehicle 30. The inboard side 40 is inboard of the outboard side 38 relative to the roof rail 60. In a lateral direction relative to the passenger cabin 68, the inboard side 40 and the outboard side 38 may be approximately six inches apart at the widest point. The first side curtain airbag 34 includes a front end 80 and a rear end 82. The front end 80 is forward of the rear end 82 relative to the passenger cabin 68. The outboard side 38 and the inboard side 40 meet at the front end 80 and at the rear end 82. The first side curtain airbag 34 includes a top edge 84 and a bottom edge 86. The top edge 84 is attached at the roof rail 60. The bottom edge 86 is opposite the top edge 84. The outboard side 38 and the inboard side 40 meet at the bottom edge 86 and the top edge 84.

The first side curtain airbag 34 may be formed of any suitable airbag material, for example, a woven polymer. For example, the first side curtain airbag 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The inboard side 40 includes the protrusion 42. When the first side curtain airbag 34 is in the inflated position, the protrusion 42 is elongated along the inboard side 40 and is spaced from the top edge 84 and from the bottom edge 86. The protrusion 42 extends inboard from the inboard side 40, e.g., approximately 2 to 4 inches. When the first side curtain airbag 34 is in the inflated position, the protrusion 42 is positioned laterally relative to the seat 70 from a position at which a neck of an occupant of 50th-percentile stature sitting in the seat 70 would be located, as shown in FIG. 3.

When the first side curtain airbag 34 is in the inflated position, the protrusion 42 is elongated in a rearward, upward-sloping direction. For example, the protrusion 42 may be elongated at an angle between 0° and 45°, e.g., approximately 15° as shown in the Figures, relative to horizontal. The protrusion 42 is thus lower for shorter occupants who position the seat 70 farther forward and higher for taller occupants who position the seat 70 farther rearward.

Figure 5:
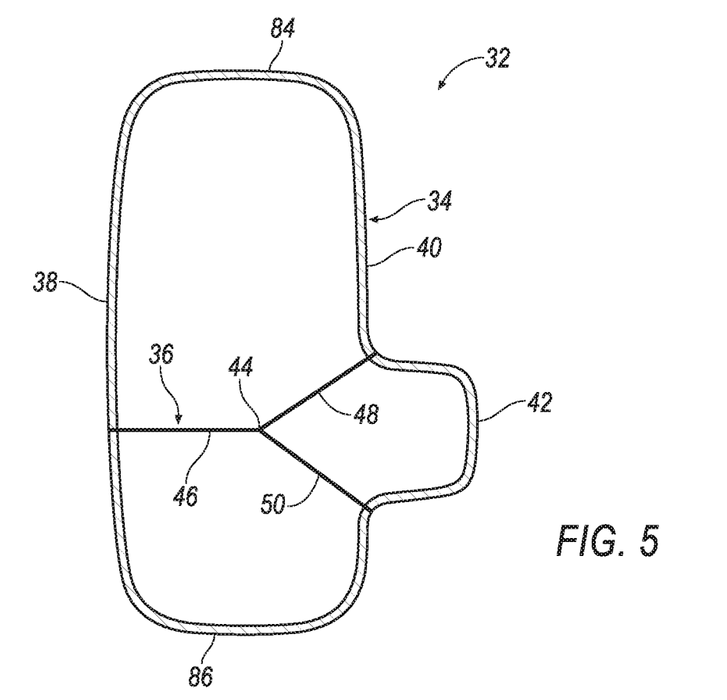
FIG. 5 is a cross-sectional view of the side curtain airbag in the inflated position.

With reference to FIGS. 5-8, the tether 36 includes the central seam 44, the first extension 46 attached at the outboard side 38, the second extension 48 attached at the inboard side 40 above the protrusion 42, and the third extension 50 attached at the inboard side 40 below the protrusion 42. The extensions 46, 48, 50 are attached to each other at the central seam 44. Lines of attachment between the extensions 46, 48, 50 and the outboard side 38 or inboard side 40 may be straight, as shown in the Figures, or may have curvature. The first extension 46, the second extension 48, and the third extension 50 define a Y-shaped cross-section of the tether 36, as best seen in FIG. 5. In other words, the central seam 44 and the extensions 46, 48, 50 may have a hub-and-spoke arrangement. The extensions 46, 48, 50 may be the same material as the first side curtain airbag 34. The extensions 46, 48, 50 may or may not correspond to panels of fabric. For example, the first extension 46 and the second extension 48 may be a single panel of fabric, and the third extension 50 may be separate panel of fabric sewn to the single panel of fabric at the central seam 44.

Figure 6:
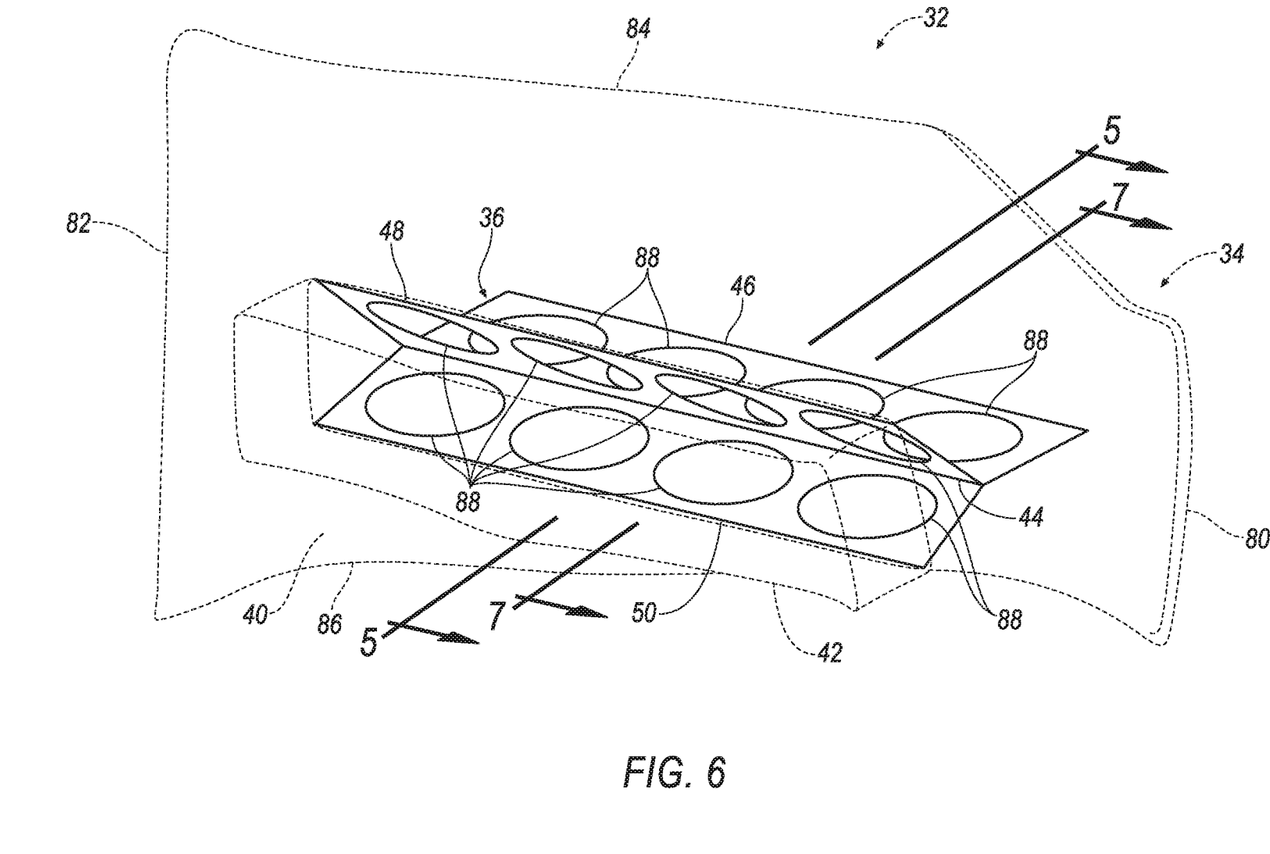
FIG. 6 is a perspective view of a first example of a tether in the side curtain airbag.
Figure 7:
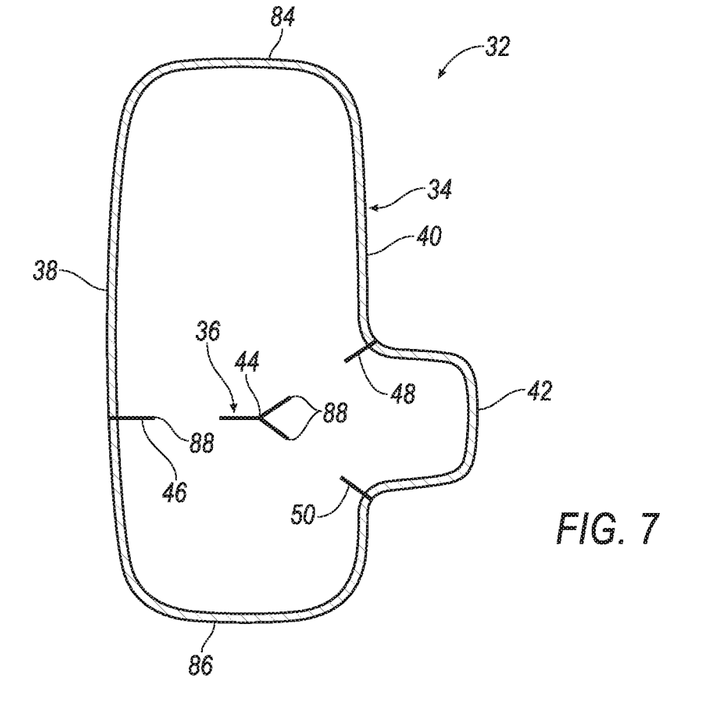
FIG. 7 is a cross-sectional view of the side curtain airbag in the inflated position with the first example tether.

FIGS. 6 and 7 show a first embodiment of the tether 36. The tether 36 extends longitudinally along a full length of the protrusion 42 when the first side curtain airbag 34 is in the inflated position. The first extension 46, second extension 48, and third extension 50 each include a plurality of cutouts 88. The cutouts 88 permit inflation medium to pass through the tether 36 while the first side curtain airbag 34 inflates from the uninflated position to the inflated position. The protrusion 42 thus begins inflating before the portion of the first side curtain airbag 34 above the tether 36 is fully inflated. For example, the cutouts 88 may be circular in shape and have a diameter of at least ¾ inch, e.g., approximately 1 inch.

Figure 8:
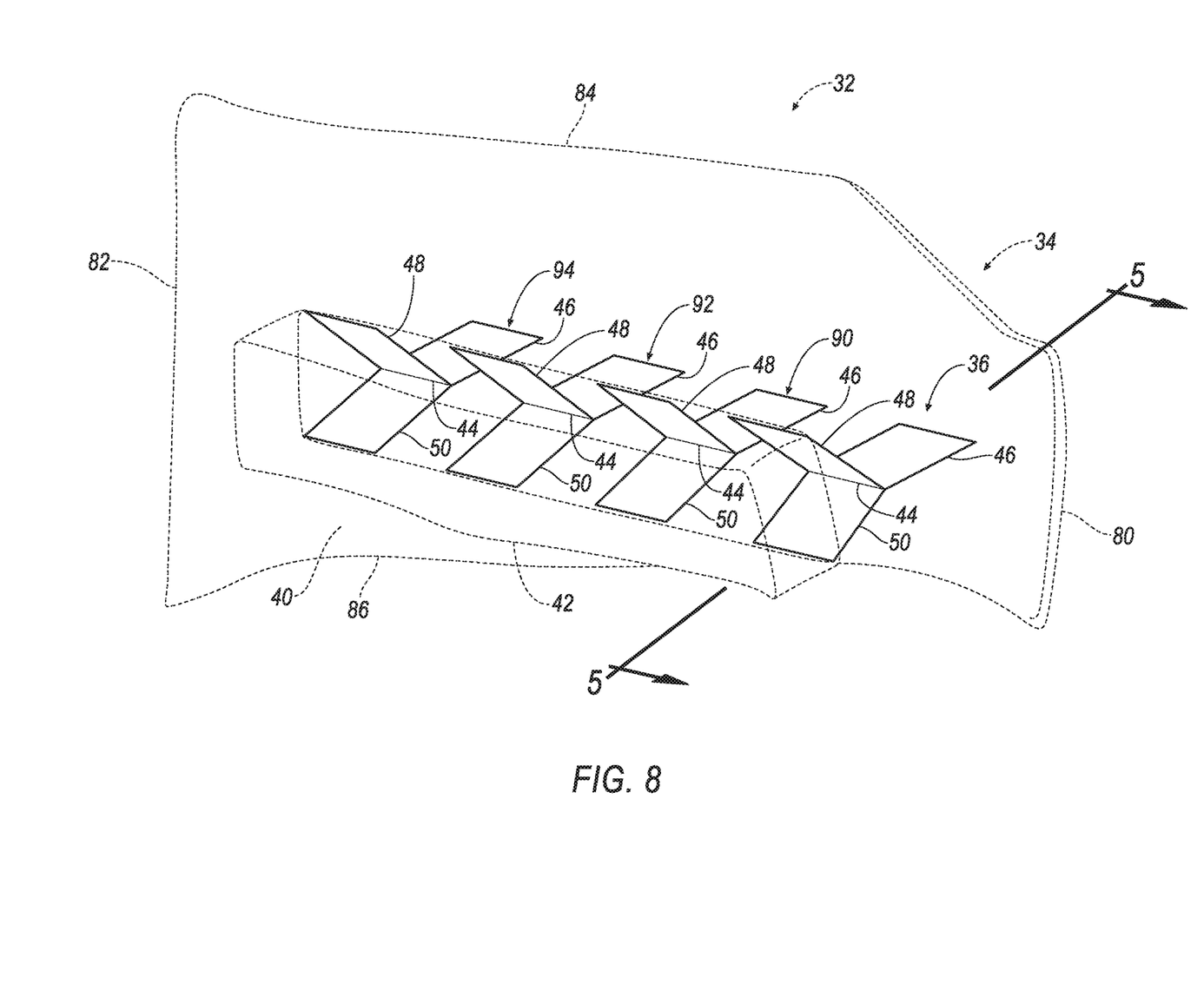
FIG. 8 is a perspective view of a second example of a tether in the side curtain airbag.

FIG. 8 shows a second embodiment of the tether 36. The tether 36 extends longitudinally for less than a full length of the protrusion 42 when the first side curtain airbag 34 is in the inflated position. The tether 36 may be a first tether 36 of a plurality of tethers 36, 90, 92, 94 including, e.g., a second tether 90, a third tether 92, a fourth tether 94, etc. The second tether 90, third tether 92, fourth tether 94, etc. each include the central seam 44, the first extension 46 attached at the outboard side 38, the second extension 48 attached at the inboard side 40 above the protrusion 42, and the third extension 50 attached at the inboard side 40 below the protrusion 42. The extensions 46, 48, 50 of the respective tethers 36, 90, 92, 94 are attached to each other at the central seams 44 of the respective tethers 36, 90, 92, 94. When the first side curtain airbag 34 is in the inflated position, the tethers 36, 90, 92, 94 may be spaced at least ¾ inch, e.g., approximately 1 inch, from each other. This spacing permits inflation medium to pass through the tethers 36, 90, 92, 94 while the first side curtain airbag 34 inflates from the uninflated position to the inflated position. The protrusion 42 thus begins inflating before the portion of the first side curtain airbag 34 above the tethers 36, 90, 92, 94 is fully inflated.

Figure 9:
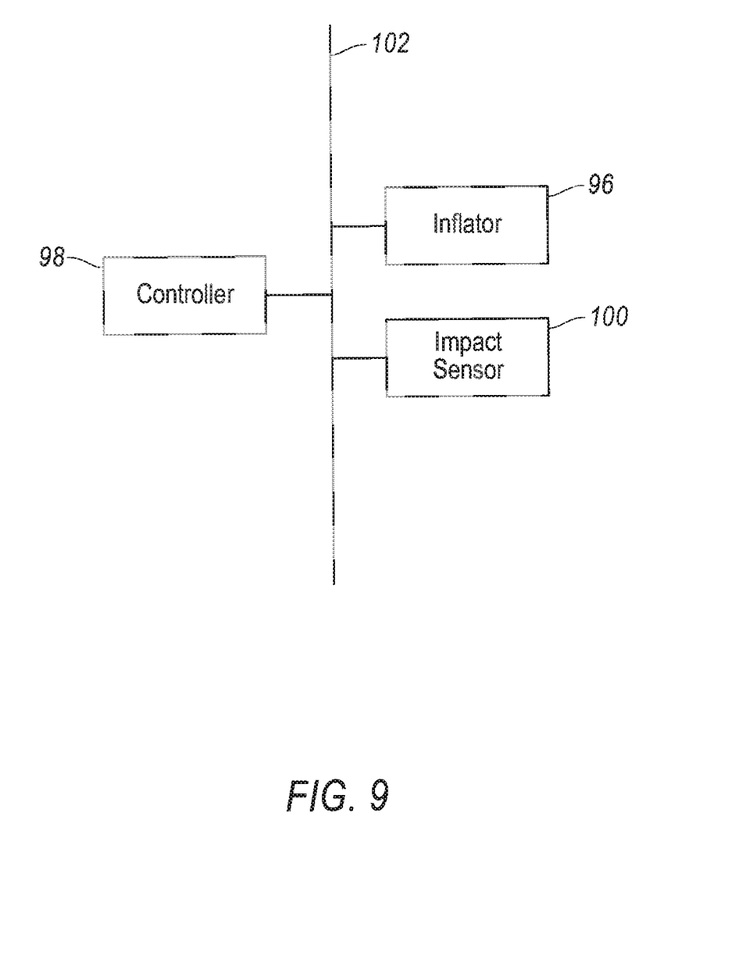
FIG. 9 is a block diagram of a control system for the side curtain airbag.

With reference to FIG. 9, an inflator 96 may be connected to the first side curtain airbag 34. Upon receiving a signal from, e.g., a controller 98, the inflator 96 may inflate the first side curtain airbag 34 with an inflatable medium, such as a gas. The inflator 96 may be, for example, a pyrotechnic inflator that uses a chemical reaction to drive inflation medium to the first side curtain airbag 34. The inflator 96 may be of any suitable type, for example, a cold-gas inflator.

An impact sensor 100 is adapted to detect an impact to the vehicle 30. The impact sensor 100 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 100 may be located at numerous points in or on the vehicle 30.

The controller 98 is a microprocessor-based controller. The controller 98 includes a processor, a memory, etc. The memory of the controller 98 includes media for storing instructions executable by the processor as well as for electronically storing data and/or databases.

The controller 98 may transmit and receive data through a communications network 102 such as a controller area network (CAN) bus, Ethernet, WiFi, Local Interconnect Network (LIN), onboard diagnostics connector (OBD-II), and/or by any other wired or wireless communications network. The controller 98 may be communicatively coupled to the inflator 96, the impact sensor 100, and other components via the communications network 102.

In the event of a side impact, the impact sensor 100 may detect the impact and transmit a signal through the communications network 102 to the controller 98. The controller 98 may transmit a signal through the communications network 102 to the inflator 96. The inflator 96 may discharge and inflate the first side curtain airbag 34. The cutouts 88 of the tether 36 (in the case of the first embodiment) or the space between the tethers 36, 90, 92, 94 (in the cases of the second embodiment) permits the inflator 96 to inflate at once all the volume of the airbag, i.e., the volume above the tether 36, below the tether 36, and in the protrusion 42. The first side curtain airbag 34 may cushion a head and shoulder of an occupant sitting in the seat 70, and the protrusion 42 may cushion a neck of the occupant and may reduce a sideways tilt, i.e., roll, of the head of the occupant.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a side curtain airbag including an outboard side and an inboard side, the inboard side including a protrusion; and
   a tether including a central seam, a first extension attached at the outboard side, a second extension attached at the inboard side above the protrusion, and a third extension attached at the inboard side below the protrusion, the extensions attached to each other at the central seam;
   wherein the side curtain airbag is inflatable to an inflated position; and
   the protrusion is elongated along the inboard side when the side curtain airbag is in the inflated position.

2. The restraint system of claim 1, wherein the tether extends longitudinally along a full length of the protrusion when the side curtain airbag is in the inflated position.

3. The restraint system of claim 1, wherein the protrusion is elongated in a rearward, upward-sloping direction when the side curtain airbag is in the inflated position.

4. The restraint system of claim 1, wherein the protrusion is elongated at an angle between 0° and 45° relative to horizontal when the side curtain airbag is in the inflated position.

5. The restraint system of claim 1, wherein the first extension includes a cutout.

6. The restraint system of claim 5, wherein the first extension includes a plurality of cutouts including the cutout.

7. The restraint system of claim 1, wherein the second extension includes a cutout.

8. The restraint system of claim 7, wherein the second extension includes a plurality of cutouts including the cutout.

9. The restraint system of claim 1, wherein the third extension includes a cutout.

10. The restraint system of claim 9, wherein the third extension includes a plurality of cutouts including the cutout.

11. The restraint system of claim 1, further comprising a second tether including a central seam, a first extension attached at the outboard side, a second extension attached at the inboard side above the protrusion, and a third extension attached at the inboard side below the protrusion, the extensions of the second tether attached to each other at the central seam of the second tether.

12. The restraint system of claim 1, further comprising a seat, wherein when the side curtain airbag is in the inflated position, the protrusion is positioned laterally relative to the seat from a position at which a neck of an occupant of 50th-percentile stature sitting in the seat would be located.

13. The restraint system of claim 1, wherein the side curtain airbag includes a top edge and a bottom edge, and the protrusion is spaced from the top edge and the bottom edge when the side curtain airbag is in the inflated position.

14. The restraint system of claim 13, further comprising a roof rail, wherein the top edge is attached at the roof rail.

15. The restraint system of claim 1, further comprising a roof rail from which the side curtain airbag is inflatable, wherein the outboard side faces outboard relative to the roof rail and the inboard side faces inboard relative to the roof rail when the side curtain airbag is in the inflated position.

16. The restraint system of claim 15, wherein the side curtain airbag is a first side curtain airbag, the restraint system further comprising a second side curtain airbag inflatable from the roof rail and disposed rearward of the first side curtain airbag.

17. The restraint system of claim 1, wherein the first extension, the second extension, and the third extension define a Y-shaped cross-section of the tether.

18. A restraint system comprising:
a side curtain airbag including an outboard side and an inboard side, the inboard side including a protrusion; and
a tether including a central seam, a first extension attached at the outboard side, a second extension attached at the inboard side above the protrusion, and a third extension attached at the inboard side below the protrusion, the extensions attached to each other at the central seam;
wherein the first extension includes a cutout.

19. The restraint system of claim 18, wherein the first extension includes a plurality of cutouts including the cutout.

20. A restraint system comprising:
a side curtain airbag including an outboard side and an inboard side, the inboard side including a protrusion; and
a tether including a central seam, a first extension attached at the outboard side, a second extension attached at the inboard side above the protrusion, and a third extension attached at the inboard side below the protrusion, the extensions attached to each other at the central seam;
wherein at least one of the second extension and the third extension includes a cutout.

* * * * *